United States Patent [19]

Sato et al.

[11] Patent Number: 4,830,957

[45] Date of Patent: May 16, 1989

[54] COLOR LIGHT-SENSITIVE MATERIAL

[75] Inventors: Kozo Sato; Masashi Takeuchi; Takeshi Shibata, all of Kanagawa, Japan

[73] Assignee: Fuji Photo Film Co., Ltd., Kanagawa, Japan

[21] Appl. No.: 105,167

[22] Filed: Oct. 7, 1987

Related U.S. Application Data

[62] Division of Ser. No. 867,121, May 27, 1986, abandoned.

[30] Foreign Application Priority Data

May 27, 1985 [JP] Japan ................................ 60-111991

[51] Int. Cl.$^4$ .......................... G03C 5/54; G03C 7/26
[52] U.S. Cl. ..................................... 430/562; 430/223; 430/224; 430/225; 430/226; 430/559
[58] Field of Search ............... 430/223, 562, 559, 225, 430/224, 226

[56] References Cited

U.S. PATENT DOCUMENTS

| | | | |
|---|---|---|---|
| 4,148,643 | 4/1979 | Chapman et al. | 430/223 |
| 4,393,132 | 7/1983 | Schenk et al. | 430/223 |
| 4,500,626 | 2/1985 | Naito et al. | 430/223 |
| 4,548,888 | 10/1985 | Crawley | 430/223 |
| 4,564,577 | 1/1986 | Begley | 430/223 |

*Primary Examiner*—Richard L. Schilling
*Attorney, Agent, or Firm*—Sughrue, Mion, Zinn, Macpeak & Seas

[57] ABSTRACT

A color light-sensitive material is disclosed. The material is comprised of a support having provided thereon at least one image-forming compound represented by formula (I)

$$(\text{Dye}-\text{X})_q\text{Y} \tag{I}$$

wherein X, Y, q, and Dye are as defined herein. The light-sensitive material shows excellent yellow dye-transferring properties and provides a yellow dye having excellent light fastness.

6 Claims, No Drawings

COLOR LIGHT-SENSITIVE MATERIAL

This is a division of U.S. patent application Ser. No. 867,121, filed May 27, 1986, now abandoned.

FIELD OF THE INVENTION

This invention relates to novel yellow azo dye image-forming compounds and light-sensitive materials containing the same.

BACKGROUND OF THE INVENTION

Color diffusion transfer photographic processes using azo dye image-forming compounds which provide, as a result of development under basic conditions, azo dyes having a different diffusibility from that of the image-forming compounds themselves have heretofore been well known. As image-forming compounds capable of releasing yellow dyes, there are illustrated, for example, those which are described in Japanese Patent Application (OPI) Nos. 7727/77 and 79031/79 (the term "OPI" as used herein means an "unexamined published patent application"), and U.S. Pat. No. 4,473,632.

However, the compounds described in the preceding literature contain an 1-aryl-5-pyrazolone or a phenol having an electron attractive group as a coupling moiety, and hence they possess defects such as that resulting dyes have small transferring properties such that a comparatively long time is required for image formation, that light fastness of the image is insufficiently small, and the like.

SUMMARY OF THE INVENTION

An object of the present invention is to provide a color light-sensitive material that contains a compound capable of providing in a short transferring time an image having a high density and a good light fastness.

This and other objects of the present invention will become more apparent from the following description.

As a result of various investigations, the inventors have found that a color light-sensitive material containing at least one azo dye image-forming compound of a particular type can effectively attain the above-mentioned objects and can provide satisfactory photographic properties overcoming the defects of the prior art.

The azo dye image-forming compound according to the present invention is represented by formula (I)

$$(\text{Dye}-X)_q Y \qquad (I)$$

wherein

X represents a single chemical bond or a divalent linking group,

Y represents a group having the properties of causing differences in diffusibility of the dye moiety before and after the reaction with the silver salt as a direct or inverse function of light-sensitive silver salt having imagewise latent image, q represents 1 or 2, and, when q represents 2, the two Dye-X groups are the same or different, and Dye represents a yellow dye group or dye group precursor represented by formula (II)

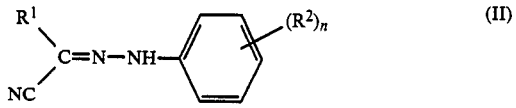

wherein $R^1$ represents a cyano group or a substituent selected from among the groups represented by following formulae (A), (B), (C), and (D)

$$-SO_2R^{11} \qquad (D)$$

wherein $R^{11}$ and $R_{12}$ each represents a hydrogen atom or a substituent selected from among substituted or unsubstituted alkyl, aralkyl, cycloalkyl, aryl, and heterocyclic groups, with $R^{11}$ and $R_{12}$ optionally being the same or different and optionally forming a ring structure through a hydrocarbon chain or a hetero atom-containing hydrocarbon chain, $R^2$ represents an electron attractive group having a Hammett's para-sigma value of from 0 to +1.0, n represents an integer of from 1 to 4 and, when n represents from 2 to 4, $R^2$s may be the same or different, Dye and X are bound to each other at either $R^{11}$ or $R_2$.

DETAILED DESCRIPTION OF THE INVENTION

The divalent linking group represented by X represents —$NR^3$— (wherein $R^3$ represents a hydrogen atom, an alkyl group, or a substituted alkyl group), —$SO_2$—, —CO—, an alkylene group, a substituted alkylene group, a phenylene group, a substituted phenylene group, a napthylene group, a substituted naphthylene group, —O—, or —SO—, or a group constituted of a combination of two or more of these groups. Of these, preferable groups are —$NR^3$—$SO_2$—, —$NR^3$—CO—, and —$R^4$—$(L)_k$—$(R^5)_l$—, wherein $R^4$ and $R^5$ each represents an alkylene group, a substituted alkylene group, a phenylene group, a substituted phenylene group, a naphthylene group, or a substituted naphthylene group, L represents —O—, —CO—, —SO—, —$SO_2$—, —$SO_2NH$—, $NHSO_2$—, —CONH—, or —NHCO—, k represents 0 or 1, and l represents 1 when k=1 or represents 1 or 0 when k=0.

In addition, a combination of —$NR^3$—$SO_2$— or —$NR^3$—CO— with —$R^4$—$(L)_k$—$(R^5)_l$— is also preferable.

The color light-sensitive material of the present invention preferably contains light-sensitive silver salts, more preferably silver halides, which are preferably provided in the same layer as that which contains the compound of formula (I).

Preferable examples of $R^{11}$ and $R_{12}$ include a substituted or unsubstituted alkyl group having from 1 to 8 carbon atoms (e.g., a methyl group, and isopropyl group, a t-butyl group, a methoxyethyl group, etc.), a substituted or unsubstituted aryl group having from 6 to 8 carbon atoms (e.g., a phenyl group, a p-methoxyphenyl group, etc.), or a substituted or unsubstituted heterocyclic group having from 4 to 8 carbon atoms (e.g., a furyl group, a thienyl group, etc.).

Preferable examples of $R^2$ include a halogen atom, a cyano group, a carboxyl group, a substituted or unsubstituted carbamoyl group having from 1 to 5 carbon atoms (e.g., a carbamoyl group, an N-methylcarbamoyl group, an N,N-dimethylcarbamoyl group, etc.), a substituted or unsubstituted sulfamoyl group having up to 4 carbon atoms (e.g., a sulfamoyl group, an N-methylsulfamoyl group, an N,N-dimethylsulfamoyl group, etc.), or a substituted or unsubstituted sulfonyl group having up to 4 carbon atoms (e.g., a methanesulfonyl group, an ethanesulfonyl group, etc.).

Dye and X are bound to each other at either $R^{11}$ or $R^2$, and particularly preferred are those wherein Dye and X are bound to each other in a manner represented by formula (III)

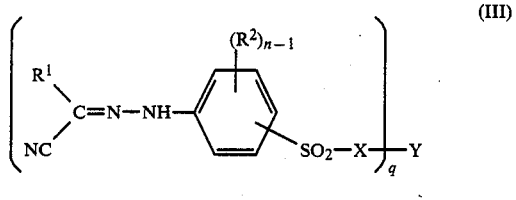

Y is described in detail below.

The image-forming compound represented by formula (I) is devided into four types (i) to (iv) as described below. Y is selected according to each type of the compound represented by formula (I).

Y is selected so as to provide (i) a non-diffusible, image-forming compound represented by formula (I), which, as a result of development processing, is oxidized to undergo self splitting with yielding a diffusible dye.

A class of examples of Y effective for the compound of type (i) are N-substituted sulfamoyl groups. For example, Y can be a group represented by formula (YI)

wherein $\beta$ represents non-metallic atoms forming a benzene ring, with this benzene ring being optionally fused with a carbocyclic ring or a heterocyclic ring to form, for example, a naphthalene ring, a quinoline ring, a 5,6,7,8-tetrahydronaphthalene ring, a chroman ring, etc.;

$\alpha$ represents a group represented by —$OG^{11}$ or —$NHG^{12}$ (wherein $G^{11}$ represents a hydrogen atom or a group which, upon being hydrolyzed, produces a hydroxy group, and $G^{12}$ represents a hydrogen atom, an alkyl group containing from 1 to 22 carbon atoms, or a group which renders —$NHG^{12}$ hydrolyzable);

Ball represents a ballast group; and b represents 0, 1, or 2.

Specific examples of Y for type (i) are described in Japanese Patent Application (OPI) Nos. 33826/73 and 50736/78.

Another class of examples of Y suited for the compound of type (i) are those represented by formula (YII)

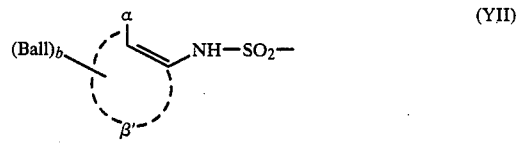

wherein Ball, $\alpha$, and b are the same as defined for formula (YI), and $\beta'$ represents atoms forming a carbocyclic ring, for example, a benzene ring, which may optionally be further fused with a carbocyclic ring or a heterocyclic ring to form a naphthalene ring, a quinoline ring, a 5,6,7,8-tetrahydronaphthalene ring, a chroman ring, etc.

Specific examples of this type Y are described in Japanese Patent Application (OPI) Nos. 113624/76, 12642/81, 16130/81, 16131/81, 4043/82 and 650/82 and U.S. Pat. No. 4,053,312.

A further class of examples of Y suited for the compound of type (i) are those which are represented by formula (YIII)

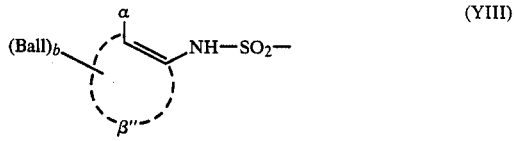

wherein Ball, $\alpha$, and b are the same as defined for formula (YI), and $\beta''$ represents atoms forming a heterocyclic ring, for example, a pyrazole ring or a pyridine ring, to which a carbon ring or a hetero ring may be bound to this hetero ring. Specific examples of this type Y are described in Japanese Patent Application (OPI) No. 104343/76.

A further class of examples of Y effective for the aforesaid compounds of type (i) are those represented by formula (YIV)

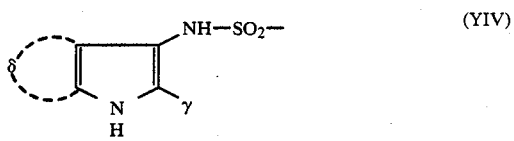

wherein $\gamma$ preferably represents a hydrogen atom or a substituted or unsubstituted alkyl, aryl, or heterocyclic group, or —CO—$G^{21}$; $G^{21}$ represents —$OG^{22}$, —S—$G^{22}$, or

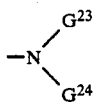

(wherein $G^{22}$ represents a hydrogen atom, an alkyl group, a cycloalkyl group or an aryl group, $G^{23}$ is the same as defined for $G^{22}$, or $G^{23}$ represents an acyl group derived from an aliphatic or aromatic carboxylic or sulfonic acid, and $G^{24}$ represents a hydrogen atom or a substituted or unsubstituted alkyl group); and $\delta$ represents an atomic group forming a fused benzene ring.

Specific examples of this type Y are described in Japanese Patent Application (OPI) Nos. 104343/76, 46730/78, 130122/79, and 85055/82.

A still further class of examples of Y suited for the aforesaid compounds of type (i) are those represented by formula (YV)

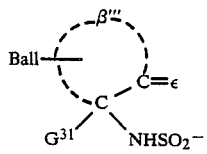
(YV)

wherein Ball is the same as defined for formula (YI); $\epsilon$ represents an oxygen atom or $=NG^{32}$ (wherein $G^{32}$ represents a hydroxy group or a substituted or unsubstituted amino group), with examples of $H_2N-G^{32}$ including hydroxylamine, hydrazines, semicarbazides, thiosemicarbazides, etc., $\beta'''$ represents atoms necessary for forming a saturated or unsaturated non-aromatic 5-, 6- or 7-membered hydrocarbon ring; and $G^{31}$ represents a hydrogen atom or a halogen atom (e.g., a fluorine atom, a chlorine atom, a bromine atom, etc.).

Specific examples of this type Y are described in Japanese Patent Application (OPI) Nos. 3819/78 and 48534/79.

In addition, further examples of this type Y are described, for example, in Japanese Patent Publication Nos. 32129/73 and 39165/73, Japanese Patent Application (OPI) No. 64436/74, U.S. Pat. No. 3,443,934, etc.

Further examples of Y according to the present invention include those which are represented by formula (YVI)

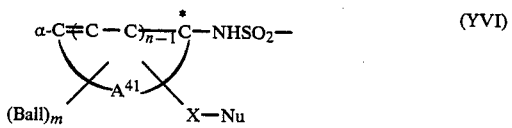
(YVI)

wherein $\alpha$ represents $OR^{41}$ or $NHR^{42}$ (wherein $R^{41}$ represents a hydrogen atom or a hydrolyzable group and $R^{42}$ represents a hydrogen atom, an alkyl group containing from 1 to 50 carbon atoms or a group which renders $NHR^{42}$ hydrolyzable); $A^{41}$ represents atoms forming an aromatic ring; Ball represents an organic immobilizing group on the aromatic ring, with two Ball groups, where exist, being the same or different; m represents an integer of 1 or 2; X represents a divalent organic group having from 1 to 8 carbon atoms, with the nucleophilic group (Nu) and an electrophilic center (asterisked carbon atom) formed by oxidation forming a 5- to 12-membered ring; Nu represents a nucleophilic group; n represents an integer of 1 or 2; and $\alpha$ is the same as defined with the above-described formula (YI). Specific examples of this type Y are described in Japanese Patent Application (OPI) No. 20735/82.

Still further type examples represented by formula (I) include (ii) non-diffusible, image-forming compounds which release a diffusible dye in the presence of a base as a result of self-cyclization or the like, but which, when reacted with an oxidation product of a developing agent, do not substantially release the dye.

Examples of Y effective for the compound of type (ii) include those which are represented by formula (YVII)

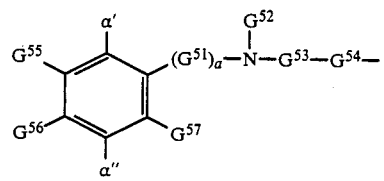
(YVII)

wherein $\alpha'$ represents an oxidizable nucleophilic group (e.g., a hydroxy group, a primary or secondary amino group, a hydroxyamino group, a sulfonamido group or the like) or a precursor thereof;

$\alpha''$ represents a dialkylamino group or an oxidizable nucleophilic group (e.g., a hydroxy group, a primary or secondary amino group, a hydroxyamino group, a sulfonamido group or the like) or a precursor thereof;

$G^{51}$ represents an alkylene group having 1 to 3 carbon atoms;

a represents 0 or 1;

$G^{52}$ represents a substituted or unsubstituted alkyl group having from 1 to 40 carbon atoms or a substituted or unsubstituted aryl group having from 6 to 40 carbon atoms;

$G^{53}$ represents an electrophilic group such as $-CO-$ or $-CS-$;

$G^{54}$ represents an oxygen atom, a sulfur atom, a selenium atom, a nitrogen atom or the like, and, when $G^{54}$ represents a nitrogen atom, it has a hydrogen atom or may be substituted by an alkyl or substituted alkyl group having from 1 to 10 carbon atoms, or by an aromatic residue having from 6 to 20 carbon atoms.

$G^{55}$, $G^{56}$, and $G^{57}$ each represents a hydrogen atom, a halogen atom, a carbonyl group, a sulfamyl group, a sulfonamide group, an alkyloxy group having from 1 to 40 carbon atoms, or is the same as defined for $G^{52}$, or $G^{55}$ and $G^{56}$ are bound to each other to form a 5- to 7-membered ring, or $G^{56}$ is represented by

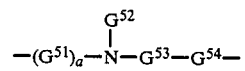

provided that at least one of $G^{52}$, $G^{55}$, $G^{56}$, and $G^{57}$ represents a ballast group. Specific examples of this type Y are described in Japanese Patent Application (OPI) No. 63618/76.

Further examples of Y suited for the compound of type (ii) include those are represented by formulae (YVIII) and (YIX)

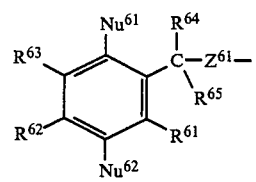
(YVIII)

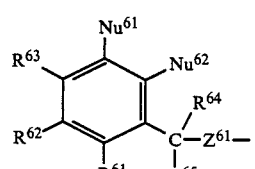
(YIX)

wherein $Nu^{61}$ and $Nu^{62}$ (which may be the same or different) each represents a nucleophilic group or a precursor thereof; $Z^{61}$ represents a divalent atom group which is electrically negative with respect to the carbon atom substituted by $R^{64}$ and $R^{65}$; $R^{61}$, $R^{62}$, and $R^{63}$ each represents a hydrogen atom, a halogen atom, an alkyl group, an alkoxy group or an acylamino group, or, when located at adjacent positions on the ring, $R^{61}$ and $R^{62}$ may form a fused ring together with the rest of the molecule, or $R^{62}$ and $R^{63}$ may form a fused ring together with the rest of the molecule; $R^{64}$ and $R^{65}$ (which may be the same or different) each represents a hydrogen atom, a hydrocarbon group or a substituted hydrocarbon group; with at least one of the substituents, $R^{61}$, $R^{62}$, $R^{63}$, $R^{64}$, and $R^{65}$, having a ballast group, Ball, of a size sufficient to render the above-described compounds immobile. Specific examples of this type Y are described in Japanese Patent Application (OPI) Nos. 69033/78 and 130927/79.

Further examples of Y suited for the compound of type (ii) include those which are represented by formula (YX)

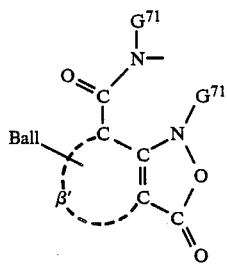

(YX)

wherein Ball and $\beta'$ are the same as defined for formula (YII), and $G^{71}$ represents an alkyl group (including a substituted alkyl group). Specific examples of this type of Y are described in Japanese Patent Application (OPI) Nos. 111628/74 and 4819/77.

As different type compounds represented by formula (I), there are illustrated (iii) non-diffusible, image-forming compounds which themselves do not release any dye but which, upon reaction with a reducing agent, do release a dye. With these compounds, those compounds which mediates the redox reaction (called electron donors) are preferably used in combination.

Examples of Y effective for the compound of type (iii) include those which are represented by formula (YXI)

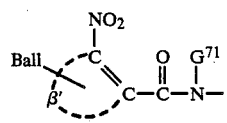

(YXI)

wherein Ball and $\beta'$ are the same as defined for formula (YII), and $G^{71}$ represents an alkyl group (including a substituted alkyl group). Specific examples of this type Y are described in Japanese Patent Application (OPI) Nos. 35533/78 and 110827/78.

Further examples of Y suited for the compound of type (iii) include those which are represented by (YXII):

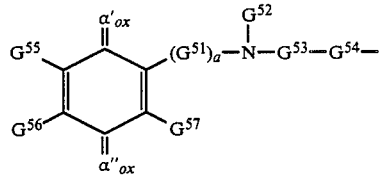

(YXII)

wherein $\alpha'_{ox}$ and $\alpha''_{ox}$ represent groups capable of giving $\alpha'$ and $\alpha''$, respectively, upon reduction, and $\alpha'$, $\alpha''$, $G^{51}$, $G^{52}$, $G^{53}$, $G^{54}$, $G^{55}$, $G^{56}$, $G^{57}$, and a are the same as defined for formula (YVII). Specific examples of this type Y are described in Japanese Patent Application (OPI) No. 110827/78 and U.S. Pat. Nos. 4,356,249 and 4,358,525.

Further examples of Y suited for the compound of type (iii) include those which are represented by formulae (YXIIIA) and (YXIIIB)

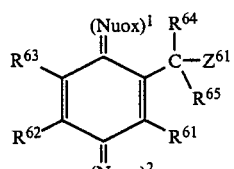

(YXIIIA)

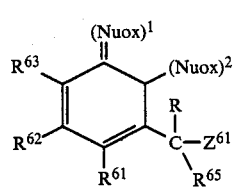

(YXIIIB)

wherein $(Nu\ ox)^1$ and $(Nu\ ox)^2$ (which may be the same or different) each represents an oxidized nucleophilic group, and other notations are the same as defined with respect to the formulae (YVIII) and (YIX). Specific examples of this type Y are described in Japanese Patent Application (OPI) Nos. 130927/79 and 164342/81.

The patent specifications referred to above with respect to YXI, YXII, YXIIIA and YXIIIB describe electron donors used in combination.

Still further different type compounds represented by formula (I) include (iv) LDA compounds (Linked Donor Acceptor Compounds). These compounds are non-diffusible, dye image-forming compounds which cause donor-acceptor reaction in the presence of a base to release a diffusible dye but, upon reaction with an oxidation product of a developing agent, they substantially do not release the dye any more.

Examples of Y effective for the compound of type (iv) include those represented by the formula (YXIV) (specific examples thereof being described in Japanese Patent Application (OPI) No. 185333/84)

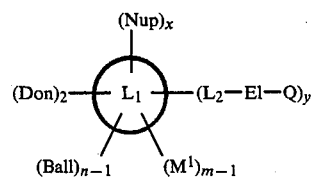

(YXIV)

wherein n, x, y, and z each represents 1 or 2; m represents an integer of 1 or more; Don represents a group containing an electron donor or a precursor moiety thereof; $L^1$ represents an organic group linking Nup to —El—Q or Don; Nup represents an electrophilic center; Q represents a divalent group; Ball represents a ballast group; $L^2$ represents a linking group; and $M^1$ represents an optional substituent.

The ballast group in formulae (YI) to (YXIV) is an organic ballast group which can render the dye image-forming compound of formula (I) non-diffusible, and is preferably a group containing a hydrophobic group having from 8 to 32 carbon atoms. Such organic ballast group is bound to the dye image-forming compound directly or through a linking group (e.g., an imino bond, an ether bond, a thioether bond, a carbonamido bond, a sulfonamido bond, a ureido bond, an ester bond, a carbamoyl bond, a sulfamoyl bond, etc., and combination thereof).

Specific examples of the image-forming compounds preferably used in the present invention are shown below.

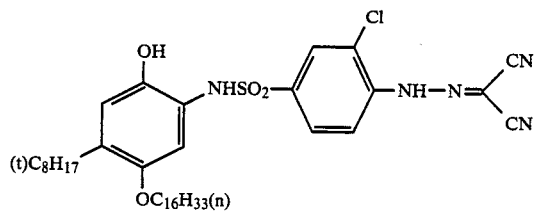

(1)

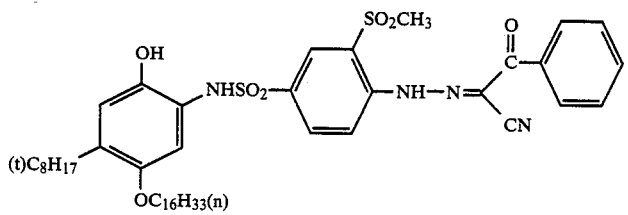

(2)

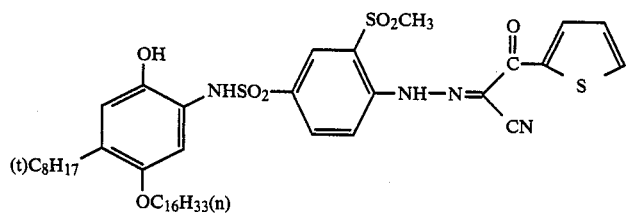

(3)

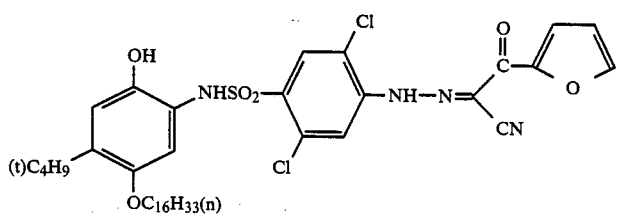

(4)

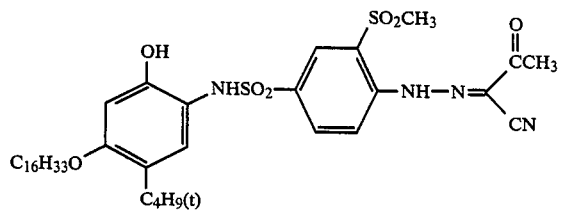

(5)

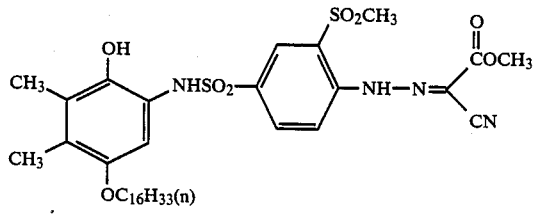

(6)

-continued
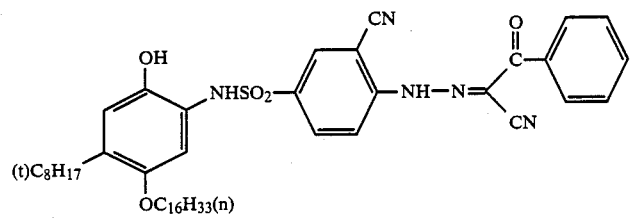
(7)
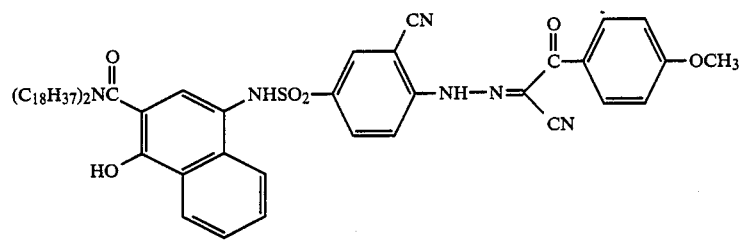
(8)
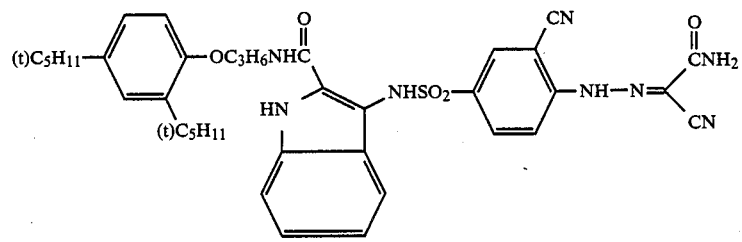
(9)
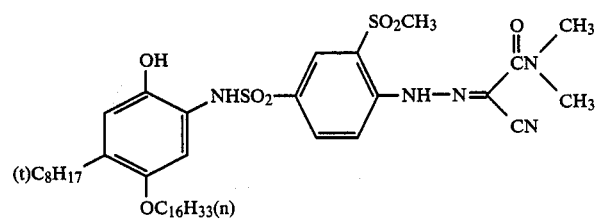
(10)
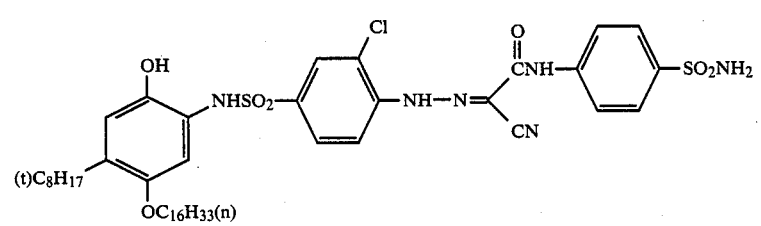
(11)
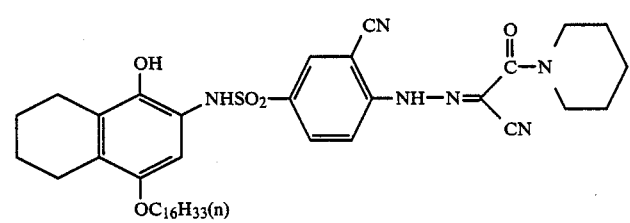
(12)
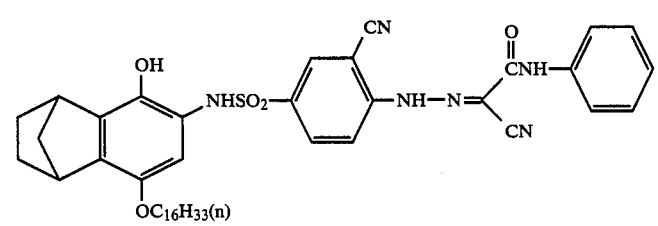
(13)

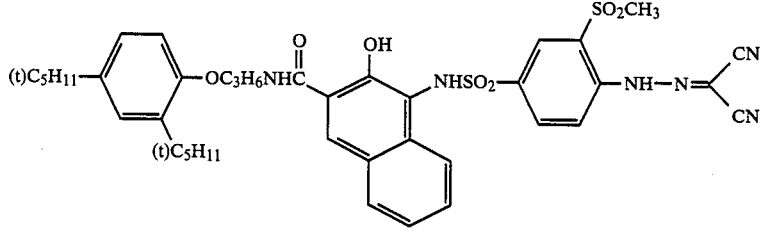
(14)
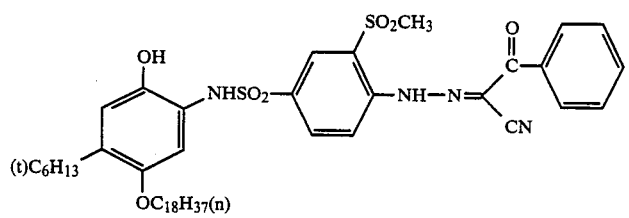
(15)
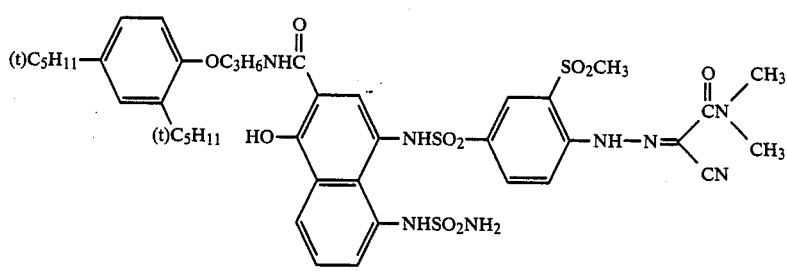
(16)
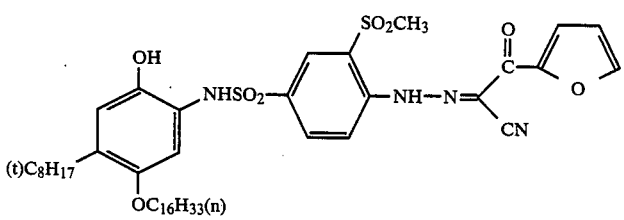
(17)
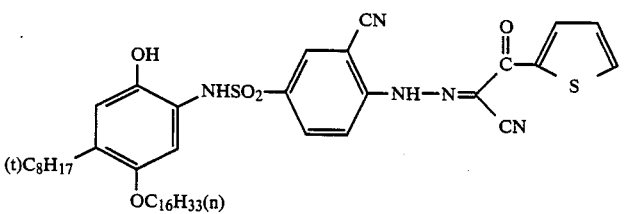
(18)
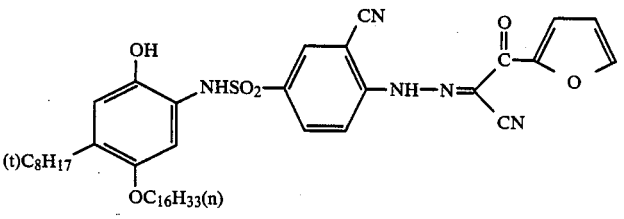
(19)
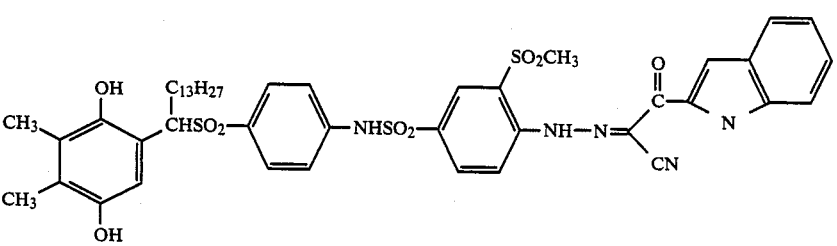
(20)

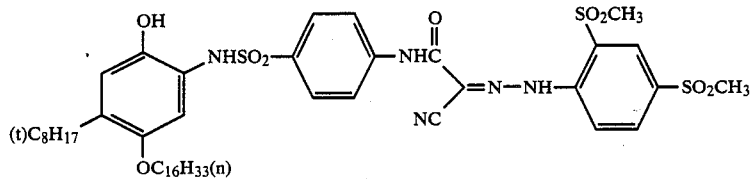
(21)
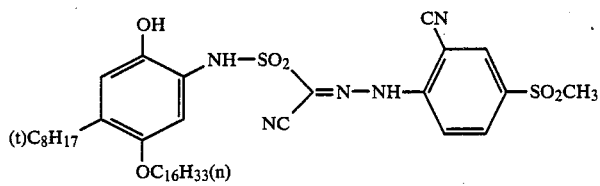
(22)
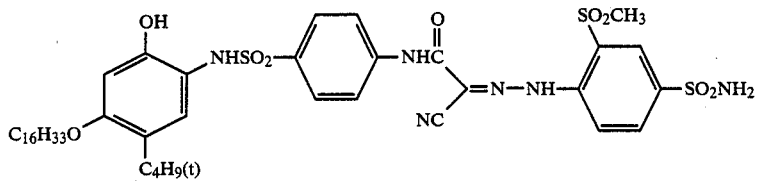
(23)
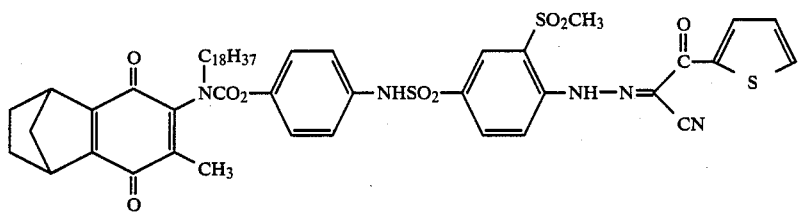
(24)
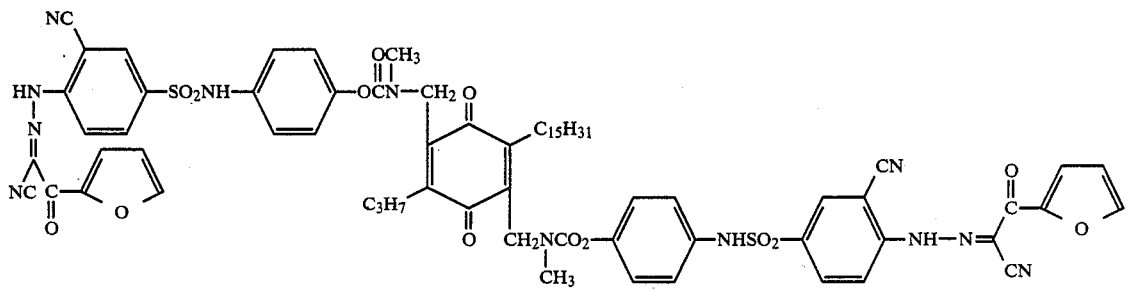
(25)
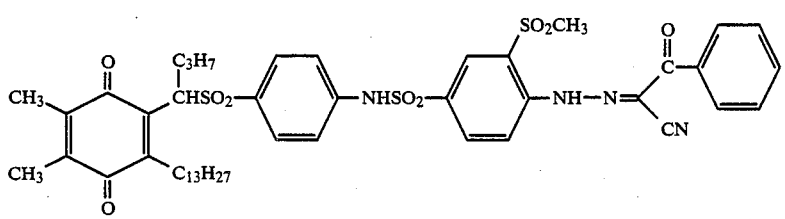
(26)
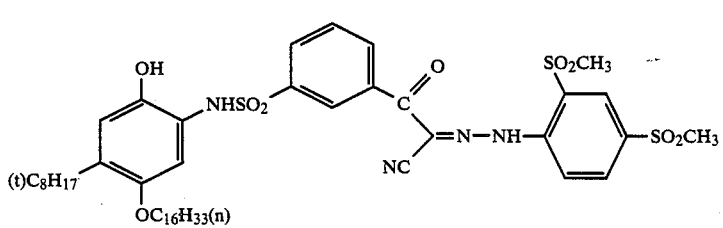
(27)

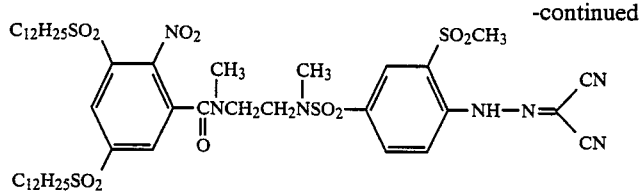
(28)

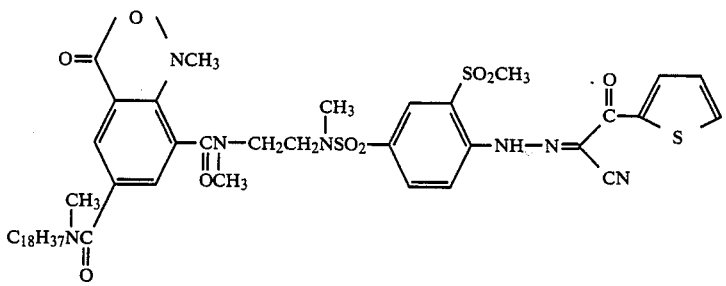
(29)

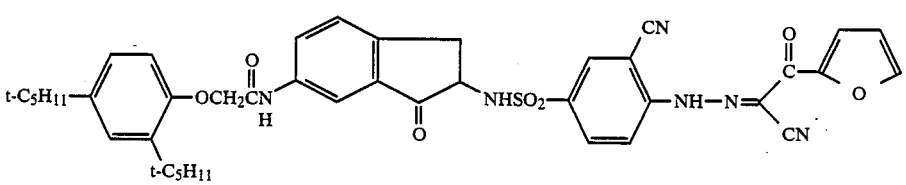
(30)

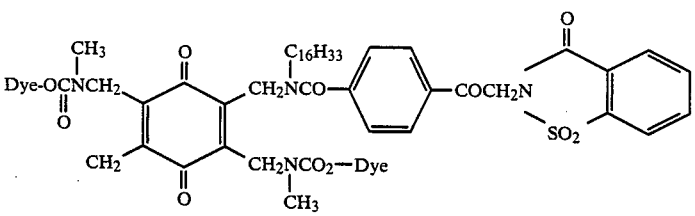
(31)

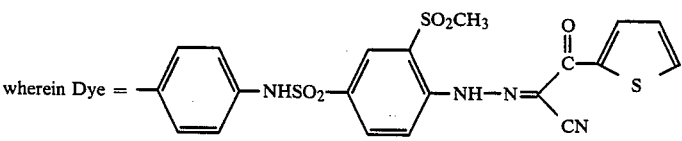

Processes for synthesizing the color image-forming compounds of the present invention are described below.

The structure of the image-forming compounds of the present invention are characterized in that the coupling component of the azo dye is a substituted acetonitrile type active methylene compound represented by formula (IV)

$$R^1-CH_2-CN \quad (IV)$$

The substituted acetonitrile type active methylene compounds may be synthesized according to several processes, but many of them are commercially available or can be readily derived from commercially available substituted acetonitrile type active methylene compounds (e.g., cyanoacetic acid, ethyl cyanoacetate, α-cyanoacetamide, etc.).

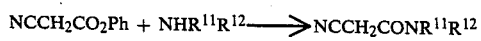

Then, the product is coupled with a diazonium salt of a suitable anilinesulfonic acid, converting the sulfo group to sulfonyl chloride, and binding to the substrate Y, thus an image-forming compound wherein Dye and X are bound to each other at $R^2$ being synthesized. The use of a sulfo group as $R^1$ gives an image-forming compound wherein Dye and X are bound to each other at $R^{11}$.

Specific synthesis examples are described below.

Step 1

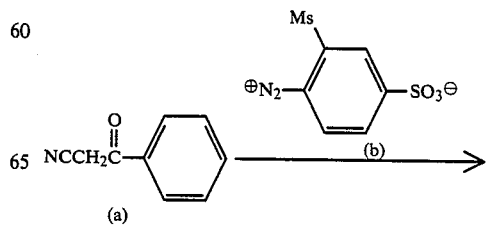

-continued

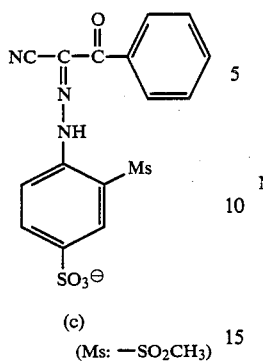

(c)

(Ms: —SO₂CH₃)

20 g (74 mmol) of calcium 2-methanesulfonylaniline-4-sulfonate was diazotized according to the process described in Shin-Jikken Kagaku Koza (14), *Yuki Kagobutsu no Gosei to Hanno* (Synthesis and Reaction of Organic Compounds) [(III)] (compiled by the Chemical Society of Japan and published by Maruzen Co., Ltd., 1978) using nitrosylsulfuric acid to prepare a diazo solution (b). Then, 10 g (69 mmol) of benzoylacetophenone (a) was mixed with 80 ml of water and 80 ml of acetonitrile and, after cooling to 0° C., the above-described diazo solution was added by portions thereto at 0° to 5° C. Further, 250 ml of a solution of 120 g of sodium acetate in water was added thereto at 5° to 10° C. to adjust the pH to 5, followed by continuing stirring for 2 hours.

Then, 30 g of tetrabutylammonium bromide was added thereto, and the solution was extracted with 400 ml of ethyl acetate. After washing the ethyl acetate layer with water, the solvent was distilled off under reduced pressure to obtain 22.8 g of Compound (c).

Step 2

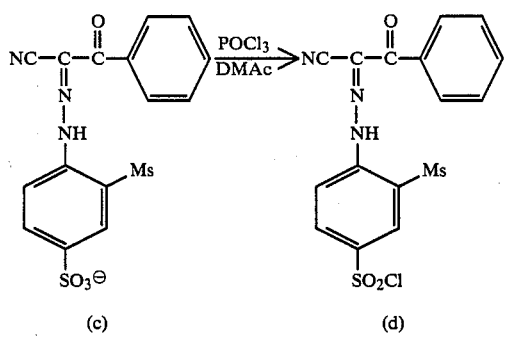

10 g of Compound (c) was dissolved in 20 ml of N,N-dimethylacetamide (DMAc) and 100 ml of acetonitrile, and 50 ml of phosphorus oxychloride was dropwise added thereto at 20° to 30° C. After stirring at 40° to 45° C. for 2 hours, the reaction mixture was poured into ice-water, and the yellow precipitate thus formed was collected by filtration, washed with water, then air-dried to obtain Compound (d). Yield: 7.3 g (17 mmol; total yield from Compound (d): 56%). mp. 184° to 186° C.

Step 3

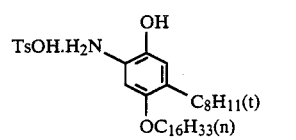

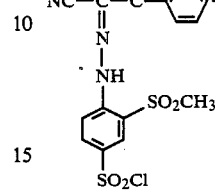

(d)

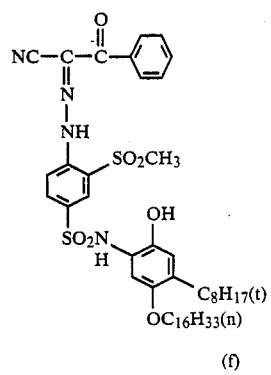

(f)

7.3 g (17 mmol) of the above-described Compound (d) was added by portions to a mixture of 10.5 g (16.6 mmol) of 2-amino-4-hexadecyloxy-5-(1,1,3,3-tetramethylbutyl)phenol p-toluenesulfonate (TsOH in the above-described formula) (e), 11 ml of pyridine, and 70 ml of N,N-dimethylacetamide under blowing a nitrogen gas thereinto. After stirring for one hour at room temperature, the reaction solution was poured into cold dilute hydrochloric acid, and a precipitate (f) thus formed was extracted with 400 ml of ethyl acetate. The ethyl acetate layer was separated, and, after washing with water and drying, the solvent was distilled off under reduced pressure. The residue was purified by column chromatography (eluting solution: ethyl acetate/chloroform =2/1) to obtain 9.4 g (11 mmol) of image-forming compound (2) (yield: 65%). mp. 200° to 202° C.

Silver halide emulsions may be used as primitive emulsions, but are usually chemically sensitized to use. Sulfur sensitization process, reduction sensitization process, noble metal sensitization process, etc., known with emulsions for ordinary light-sensitive materials may be employed independently or in combination.

Silver halide emulsions to be used in the present invention may be of surface latent image type forming a latent image primarily on the surface of grains or of inner latent image type forming a latent image inside the grains. A direct reversal emulsion wherein the inner latent image type emulsion is combined with a nucleating agent may also be used.

The light-sensitive silver halide to be used in the present invention is coated in a silver amount of 1 mg to 10 g per m².

In the present invention, organic metal salts comparatively stable against light are desirably used as oxidants together with light-sensitive silver halide.

Usable organic silver salts are described in detail in U.S. Pat. No. 4,500,626.

Silver halides to be used in the present invention may be spectrally sensitized with methine dyes or the like.

These dyes and details thereon are given in U.S. Pat. No. 4,500,626.

The light-sensitive material of the present invention may contain a reducing agent. As the reducing agent, those which are known in the art and dye image-forming compounds having a reducing ability are preferable.

Specific examples of the reducing agents that can be used in the present invention include those described in U.S. Pat. No. 4,500,626.

The color light-sensitive material of the present invention may contain a magenta image-forming compound and a cyan image-forming compound as well as the yellow image-forming compound of the general formula (I) and, further, a known yellow image-forming compound which is to be used in an amount of not adversely affecting the present invention, to obtain a wide range of colors in chromaticity diagram. Therefore, the light-sensitive material of the present invention may have at least three light-sensitive silver salt layers respectively responding to different spectral regions.

Typical combinations of the at least three light-sensitive silver salt emulsion layers respectively responding to different spectral regions are described in U.S. Pat. No. 4,500,626.

The light-sensitive material to be used in the present invention may have, if desired, two or more emulsion layers responding to the same spectral region, but differing from each other in sensitivity.

The above-described dye image-forming compounds are added to the above-described light-sensitive silver salt emulsion layers and/or light-insensitive hydrophilic colloidal layers adjacent to the light-sensitive silver salt emulsion layers. Introduction of the compounds may be conducted according to known processes described in U.S. Pat. No. 2,322,027, etc., together with photographic additives. In this situation, ordinarily used high-boiling organic solvents, low-boiling organic solvents, various surfactants, etc., may be employed. In the present invention, the organic solvents are used in amounts of 10 g of less, preferably 5 g or less, per g of the image-forming compound used.

The photographic element of the color light-sensitive material of the present invention is constituted of a light-sensitive element which, as a result of development, forms or releases dyes to form a dye image, and, if desired, a dye-fixing element which fixes the dyes. Particularly, in the system of forming images by diffusion transfer of dyes, both the light-sensitive element and the dye-fixing element are necessary, and typical embodiments are classified into two types: one being those wherein the light-sensitive element and the dye-fixing element are separately coated on two different supports; and the other being those wherein the two embodiments are coated on the same support.

Developing processes to be applied to this light-sensitive material are not particularly limited, but a thermal developing process is particularly useful.

That is, particularly in the thermal developing process, the yellow image-forming compound of the present invention represented by formula (I) is a dye-providing substance which, upon reduction of a light-sensitive silver salt to silver at elevated temperatures, produces or releases a mobile yellow dye as a direct or inverse function of the reaction. The light-sensitive material of the present invention may contain the aforesaid known magenta and cyan image-providing substances or known yellow dye-providing substances together with the compound of formula (I).

As the dye image-forming compounds capable of being used together in the present invention, i.e., dye-providing substances, there are first illustrated couplers capable of reacting with a developing agent. This process of utilizing couplers is a process wherein an oxidization product of a developing agent produced by the oxidation-reduction reaction between silver salt and developing agent reacts with couplers to form dyes, and are extensively described in the technical literature. Specific examples of the developing agents and the couples are described, for example, in T. H. James, "*The Theory of The Photographic Process*", 4th Ed., pp. 291–334 and pp. 354–361, Macmillan Publishing Co., 1977; and Shinichi Kikuchi, "*Shashin Kagaku*", 4th Ed. (published by Kyoritsu Shuppan), pp. 284–295.

Dye-silver compounds wherein an organic silver salt is bound to a dye are also included in the dye-providing substances. Specific examples of the dye-silver compound are described, for example, in *Research Disclosure*, May 1978, pp. 54–58 (RD No. 16966), etc.

In addition, azo dyes to be used in thermally developable silver-dye bleach process are also included in the dye-providing substances. Specific examples of the azo dye and bleaching process are described in U.S. Pat. No. 4,235,957, *Research Disclosure*, April 1976, pp. 30–32 (RD No. 14433), etc.

Leuco dyes described in U.S. Pat. Nos. 3,985,565 and 4,022,617 are also included in the dye-providing substances.

Examples of another type of dye-providing substance include those compounds which have the function of imagewise releasing or diffusing a diffusible dye.

This type compounds can be represented by formula (LI)

$$(Dye'—X')_n—Y' \qquad (LI)$$

wherein

Dye' represents a dye moiety represented by formula (II), a dye precursor moeity or a known dye group or a dye precursor group;

X' represents a simple chemical bond or a divalent linking group;

Y' represents a group which produces a difference in diffusibility of the compound represented by (Dye'—X') —Y' in a direct or inverse conformity with light-sensitive silver salt having an imagewise latent image, or which releases Dye' to produce different in diffusibility between the released Dye' and the compound represented by (Dye'—X')$_n$—Y'; and n represents 1 or 2, provided that when n represents 2, the two Dye'—X' groups are the same or different.

As specific examples of the dye-providing substance represented by formula (LI), dye developers wherein a hydroquinone type developing agent is bound to a dye component are described in U.S. Pats. Nos. 3,134,764, 3,362,819, 3,597,200, 3,544,545, 3,482,972, etc. In addition, Japanese Patent Application (OPI) No. 63618/76, etc., describe substances which release a diffusible dye by intramolecular nucleophilic substitution reaction, and Japanese Patent Application (OPI) No. 111628/74, etc., describe substances which release a diffusible dye by intramolecular re-cyclizing reaction of an isoxazolone ring. All of these processes are processes wherein diffusible dyes are released or diffused in portions in which development has not taken place, and no dyes are released or diffused in portions in which development has taken place.

Another process has been developed in which the dye-releasing compound is incorporated as an oxidized form having no dye-releasing ability together with a reducing agent or a precursor thereof, and, after development, the reducing agent that has not been oxidized reduces the dye-releasing compound to thereby release a diffusible dye. Specific examples of the dye-providing substances to be used for such process are described in Japanese Patent Application (OPI) Nos. 110827/78, 130927/79, 164342/81 and 35533/78.

On the other hand, as substances that release a diffusible dye in areas where development has taken place, substances which release a diffusible dye by the reaction between a coupler having a diffusible dye as an eliminating group and an oxidization product of a developing agent are described in British Pat. No. 1,330,524, Japanese Patent Publication No. 39165/73, U.S. Pat. No. 3,443,940, etc., and those substances which produce a diffusible dye by reaction between a coupler having a diffusion-resistant group as an eliminating group and an oxidation product of a developing agent are described in U.S. Pat. No. 3,227,550, etc.

With the process of using these color developers, stain of image with an oxidation decomposition products of the developers is a serious problem. For the purpose of solving this problem, dye-releasing compounds which themselves have a reducing ability and do not require developing agents are proposed.

Typical examples thereof are illustrated in the following literature. For example, any of the various dye-providing substances described in U.S. Pat. Nos. 3,928,312, 4,053,312, 4,055,428, 4,336,322; Japanese Patent Application (OPI) Nos. 65839/84, 69839/84, 3819/78, 104343/76; Research Disclosure, RD No. 17465, October 1978; U.S. Pat. Nos. 3,725,062, 3,728,113, 3,443,939, Japanese Patent Application (OPI) No. 116537/83, etc., can be used in combination with the compounds of the present invention.

Specific examples of the dye-providing substances that can be used in combination with the dye-providing substance of the present invention include those compounds which are described in Japanese Patent Application (OPI) No. 84236/84.

As to the relation between the light-sensitive element and the dye-fixing element in the light-sensitive material of the present invention, relation with support, and relation with white reflection layer, those described in U.S. Pat. No. 4,500,626 are also applicable to the present invention.

In the light-sensitive element there may be provided, if desired, auxiliary layers such as a protective layer, an interlayer, an antistatic layer, a curl-preventing layer, a peeling layer, a matting layer, etc. These layers are coated by the method described in U.S. Pat. No. 4,500,626.

In addition, an organic or inorganic matting agent is usually incorporated particularly in a protective layer for the purpose of preventing adhesion. This protective layer may further contain a mordant, an ultraviolet ray absorbent, etc. The protective layer and the interlayer may be constituted by two or more layers.

The interlayer may contain a reducing agent for preventing color contamination, an ultraviolet ray absorbent, and a white pigment such as $TiO_2$. The white pigment may also be added to emulsion layers as well as the interlayer for the purpose of enhancing sensitivity.

The dye-fixing element has at least one layer containing a mordant, and, where the dye-fixing layer is provided on the surface, a protective layer may further be provided thereon, if desired.

In addition to the above-mentioned layers, the dye-fixing element to be used in the present invention may have, if necessary, auxiliary layers such as a peeling layer, a matting agent layer, a curl-preventing layer, etc.

In one or a plurality of the above-described layers may be incorporated a base and/or a base precursor for accelerating migration of dye, a hydrophilic thermal solvent, an agent for preventing dye contamination, an ultraviolet ray absorbent, a dispersed vinyl compound for increasing dimensioned stability, a fluorescent brightening agent, etc.

As to the stratum structure of the above-described light-sensitive element and/or dye-fixing element, binder, additives, process for adding mordants, and positions to provide them, those described in U.S. Pat. No. 4,500,626 can be applied to the present invention.

As light sources of imagewise exposure for recording images on the light-sensitive material of the present invention, radiation including visible light can be used. For example, those light sources which are described in U.S. Pat. No. 4,500,626 may be used.

An image formulation-accelerating agent may be used in the light-sensitive material of the present invention. The image formation-accelerating agents function to accelerate oxidation-reduction reaction between a silver salt oxidant and a reducing agent and reaction of production of a dye from a dye-providing material or decomposition of a dye or release of a mobile dye, and function to accelerate migration of a dye from a light-sensitive element layers to a dye-fixing layer. They are classified, in view of physical and chemical function, as bases or base precursors, nucleophilic compounds, oils, thermal solvents, surfactants, compounds performing mutual action with silver or silver ion, and the like. However, these substances usually possess a plurality of these physical and chemical functions, and usually perform some of the above-described accelerating functions. Further details thereon are described in U.S. Pat. No. 4,500,626.

In the light-sensitive material of the present invention, various development-stopping agents may be used for obtaining constant image even when processing temperature and processing time upon development vary.

The term "development-stopping agent" as used herein means those compounds which, after proper development, rapidly neutralize or react with the base to lower the base concentration in the film to stop development, or those compounds which interact with silver and silver salt to inhibit development.

In addition, the light-sensitive material of the present invention may contain compounds which both activate development and stabilize the image.

The light-sensitive material of the present invention may contain, if desired, a toning agent. Specific examples of effective toning agents are described in U.S. Pat. No. 4,500,626.

Binders used in the light-sensitive element or the dye-fixing element of the present invention may be used alone or in combination. Hydrophilic binders may be used. Typical examples of the hydrophilic binder are transparent or semitransparent hydrophilic binders and include substances such as proteins (e.g., gelatin and gelatin derivatives), cellulose derivatives, and polysaccharides (e.g., starch, gum arabic, etc.) and synthetic polymers such as water-soluble polyvinyl compounds (e.g., polyvinylpyrrolidone, acrylamide polymers, etc.). Other synthetic polymer substances that can be used include dispersed vinyl compounds in a latex form which serve to increase dimensional stability of photographic materials.

In the present invention, the binder is generally coated in an amount of 20 g/m$^2$ or less, preferably 10 g/m$^2$ or less, more preferably 7 g/m$^2$ or less.

As to the ratio of the high-boiling organic solvent to be dispersed in the binder together with the hydrophobic compounds such as dye-providing substances to the binder, generally 1 cc or less, preferably 0.5 cc or less, and more preferably 0.3 cc or less of the solvent is used per g of the binder.

Supports to be used in the light-sensitive element of the light-sensitive material of the present invention, and, in some cases, in the dye-fixing element, must withstand the processing temperatures in thermal development processing. As general supports, glass, paper, metal, and their analogs, and those described in U.S. Pat. No. 4,500,626 as supports, may be used.

A dye migration aid may be used in the light-sensitive material of the present invention for accelerating migration of dyes from a light-sensitive element to a dye-fixing element.

In a manner of providing the migration aid from outside, water or a basic aqueous solution containing sodium hydroxide, potassium hydroxide, an inorganic alkali metal salt, or an organic base is used as the dye migration aid. As the bases, those described in the item of image formation-accelerating agents may be used. Further, low-boiling solvents such as methanol, N,N-dimethylformamide, acetone, diisobutyl ketone, etc., or a mixture of these solvents and water or a basic aqueous solution may be used. The dye migration aid may be used in a manner of wetting a dye-fixing element and/or a light-sensitive element with it.

Incorporation of the migration aid in the light-sensitive element or the dye-fixing element eliminates the necessity of providing the migration aid from outside. As to the technique of giving the dye migration aid to the light-sensitive element layer or to the dye-fixing element layer, there are those which are described, for example, in U.S. Pat. No. 4,500,626.

In conducting development of the light-sensitive element of the present invention and/or transfer of soluble dyes to the dye-fixing element, there may be employed heating means such as mere hot plate, iron, hot roller, etc. Particularly, in the case of employing energize-heating technique, a transparent or opaque heating element may be prepared as an electric resistance heater utilizing known techniques.

As the electric resistance heater elements that may be used include those which are prepared by utilizing a thin film of inorganic material showing semi-conductor properties and those which are prepared by utilizing an organic thin film containing conductive particles dispersed in a binder. Specific examples of the materials usable for these processes are described in U.S. Pat. No. 4,500,626. The positional relation between the heating element and the light-sensitive element described in U.S. Pat. No. 4,500,626 may be applied to the present invention. Alternatively, the heating element of electric resistance heater may be provided on the dye-fixing element.

In separately conducting the step of thermally developing the light-sensitive element and the step of transferring dyes to the dye-fixing element, heating temperatures of about 80° C. to about 250° C. suffice for heating the light-sensitive material in the heat-developing step, with about 110° C. to about 180° C. being particularly useful. The heating temperature to be applied to in the aforesaid transfer step may be the same as the temperature in the heat-developing step down to room temperature, with the temperature lower than the temperature employed in the heat-developing step by 10° C. being particularly preferred.

In addition, as is described in detail in Japanese Patent Application (OPI) No. 218443/84, a process of conducting development and transfer simultaneously or continuously is also useful. In this process, the aforementioned image formation-accelerating agent and/or the dye migration aid may be preliminarily incorporated in one or both of the dye-fixing element and the light-sensitive element, or may be fed from outside. In this process of conducting development and transfer simultaneously or continuously, the heating temperature is preferably 60° C. or higher, and lower than the boiling point of the solvent used for transfer. For example, where water is used as a transferring solvent, temperature of from 60° to 100° C. are desirable.

As pressing conditions upon closely superposing the light-sensitive element on the dye-fixing element and techniques for applying pressure thereto, those described in U.S. Pat. No. 4,500,626 are applicable.

The present invention is now illustrated in more detail by reference to the following example, which, however, is not to be construed as limiting the present invention in any way.

EXAMPLE

A benzotriazole silver salt emulsion was prepared as follows.

28 g of gelatin and 13.2 g of benzotriazole were dissolved in 300 ml of water. This solution was kept at 40° C. and stirred. A solution of 17 g of silver nitrate in 100 ml of water was added to this solution in 2 minutes.

The pH of this benzotriazole silver salt emulsion was adjusted to flocculate for removing excess salts. Then, the pH was adjusted to 6.30 to obtain 400 g of a benzotriazole silver salt emulsion.

A silver halide emulsion for the 5th and the 1st layers was prepared as follows.

600 ml of an aqueous solution containing sodium chloride and potassium bromide and an aqueous solution of silver nitrate (prepared by dissolving 0.59 mol of silver nitrate in 600 ml of water) were simultaneously added at an equal flow rate of a well stirred gelatin aqueous solution (containing 20 g of gelatin and 3 g of sodium chloride in 1000 ml of water, and kept at 75° C.) over 40 minutes. Thus, a mono-disperse cubic silver chlorobromide emulsion (bromide: 50 mol %) of 0.40 μm in average grain size was prepared.

After washing with water and removing salts, 5 mg of sodium thiosulfate and 20 mg of 4-hydroxy-6-methyl-1,3,3a,7-tetrazaindene were added thereto to conduct chemical sensitization at 60° C. Thus, 600 g of an emulsion was obtained.

A silver halide emulsion for the 3rd layer was prepared as follows.

600 ml of an aqueous solution containing sodium chloride and potassium bromide and an aqueous solution of silver nitrate (prepared by dissolving 0.59 mol of silver nitrate in 600 ml of water) were simultaneously added at an equal flow rate of a well-stirred aqueous gelatin solution (containing 20 g of gelatin and 3 g of sodium chloride in 1000 ml of water, and kept at 75° C.) over 40 minutes. Thus, a mono-disperse cubic silver chlorobromide emulsion (bromide: 30 mol %) of 0.35 μm in average grain size was prepared.

After washing with water and removing salts, 5 mg of sodium thiosulfate and 20 mg of 4-hydroxy-6-methyl-1,3,3a,7-tetrazaindene were added thereto to conduct chemical sensitization at 60° C. Thus, 600 g of an emulsion was obtained.

A gelatin dispersion of dye-providng substance was prepared as follows.

5 g of yellow dye-providing substance (2) represented by formula (I), 0.5 g of sodium 2-ethylhexyl sulfosuccinate (surfactant) and 10 g of triisononyl phosphate were weighed, and 30 ml of ethyl acetate was added thereto, followed by heating to about 60° C. to prepare a uniform solution. This solution was stirred and mixed with 100 g of a 10% lime-processed gelatin solution, then subjected to a homogenizer for 10 minutes at 10,000 rpm to disperse. This dispersion is referred to as a yellow dye-providing substance dispersion.

A magenta dye-providing substance dispersion was prepared in the same manner as described above except for using the following magenta dye-providing substance (A) and using 7.5 g of tricresyl phosphate as a high-boiling solvent.

A cyan dye-providing substance dispersion was prepared in the same manner as with the yellow dye-providing substance dispersion using the following cyan dye-providing substance (B).

A multi-layered color light-sensitive material having the structure indicated in Table 1 was prepared therewith.

TABLE 1

| | Coated amount |
|---|---|
| 6th layer: | |
| Gelatin | 1000 mg/m$^2$ |
| Base precursor *3 | 600 mg/m$^2$ |
| Silica *5 | 100 mg/m$^2$ |
| Hardener *6 | 100 mg/m$^2$ |
| 5th layer: Green-sensitive emulsion layer | |
| Silver bromochloride emulsion (bromide: 50 mol %) | 400 mg/m$^2$ of Ag |
| Benzenesulfonamide | 180 mg/m$^2$ |
| Benzotriazole silver salt emulsion | 100 mg/m$^2$ |
| Sensitizing dye D-1 | $10^{-6}$ mol/m$^2$ |
| Base precursor *3 | 390 mg/m$^2$ |
| Yellow dye-providing substance (2) | 400 mg/m$^2$ |
| Gelatin | 1000 mg/m$^2$ |
| High-boiling solvent *4 | 800 mg/m$^2$ |
| Surfactant *2 | 100 mg/m$^2$ |
| 4th layer: Interlayer | |
| Gelatin | 1200 mg/m$^2$ |
| Base precursor *3 | 600 mg/m$^2$ |
| 3rd layer: Red-sensitive emulsion layer | |
| Silver chlorobromide emulsion (bromide: 80 mol %) | 300 mg/m$^2$ of silver |
| Benzenesulfonamide | 180 mg/m$^2$ |
| Benzotriazole silver salt emulsion | 100 mg/m$^2$ of silver |
| Sensitizing dye D-2 | $8 \times 10^{-7}$ mol/m$^2$ |
| Base precursor *3 | 350 mg/m$^2$ |
| Magenta dye-providing substance (A) | 400 mg/m$^2$ |
| Gelatin | 1000 mg/m$^2$ |
| High-boiling solvent *1 | 600 mg/m$^2$ |
| Surfactant *2 | 100 mg/m$^2$ |
| 2nd layer: Interlayer | |
| Gelatin | 1000 mg/m$^2$ |
| Base precursor *3 | 600 mg/m$^2$ |
| 1st layer: Infrared light-sensitive layer | |
| Silver chlorobromide emulsion (bromide: 50 mol %) | 300 mg/m$^2$ of Ag |
| Benzenesulfonamide | 180 mg/m$^2$ |
| Benzotriazole silver salt emulsion | 100 mg/m$^2$ of silver |
| Sensitizing dye D-3 | $10^{-8}$ mol/m$^2$ |
| Base precursor *3 | 390 mg/m$^2$ |
| Cyan dye-providing substance (B) | 300 mg/m$^2$ |
| Gelatin | 1000 mg/m$^2$ |
| High-boiling solvent *4 | 600 mg/m$^2$ |
| Surfactant *2 | 100 mg/m$^2$ |

SUPPORT
*1: tricresyl phosphate

TABLE 1-continued
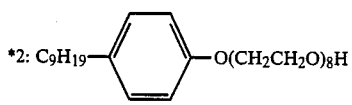
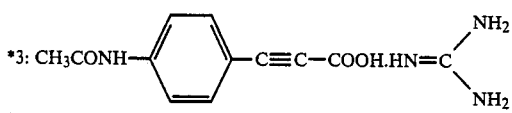
*4: (iso-$C_9H_{19}O)_3P=O$
*5: size 4 μm
*6: 1,2-bis(vinylsulfonylacetamido)ethane
Dye-providing substances:
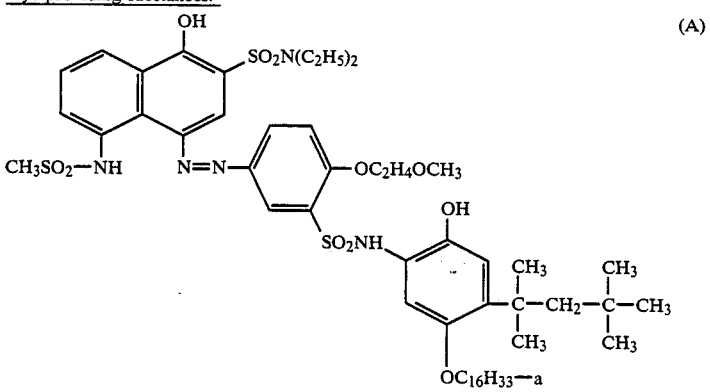
(A)
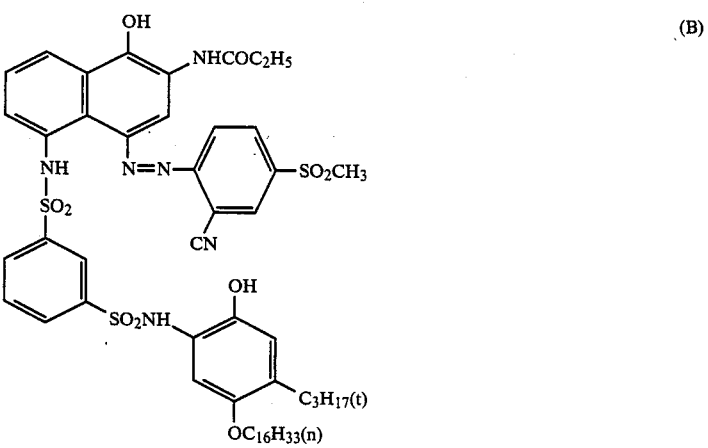
(B)
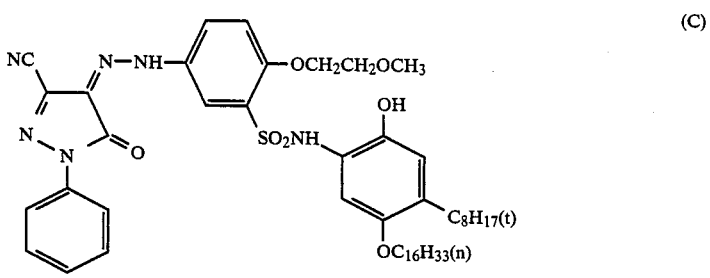
(C)
Sensitizing dye:
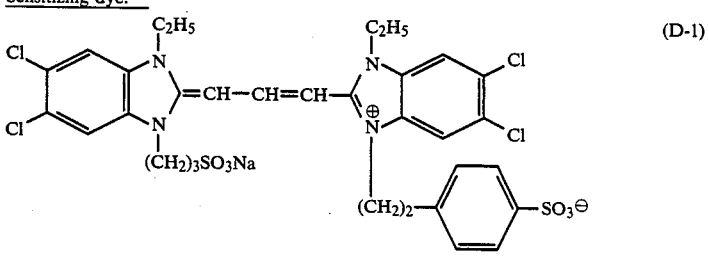
(D-1)

TABLE 1-continued

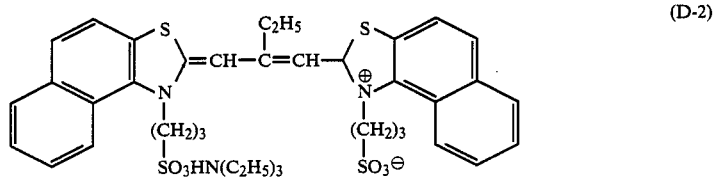
(D-2)

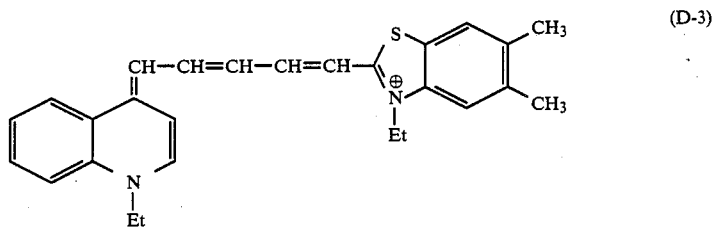
(D-3)

Then, in absolutely the same manner as described above except for using aforesaid yellow dye-providing substance (C), illustrative yellow dye-providing substance (C), illustrative yellow dye-providing substance (3), (10), (12), (17), (18), (21), (24), (27) or (31) in place of the yellow dye-providing substance (2), multilayer color light-sensitive elements were prepared.

A dye-fixing element having a dye-fixing layer was prepared as follows.

First 0.75 g of gelatin hardener H-1 of the following structure, 0.25 g of H-2, 155 ml of water, 5 ml of 1% surfactant W-1, and 100 g of 10% lime-processed gelatin were uniformly mixed. This mixture solution was uniformly coated in a wet thickness of 60 μm on a paper support laminated with polyethylene containing dispersed therein titanium oxide, then dried.

Gelatin hardener H-1:

Gelatin hardener H-2:

Surfactant W-1

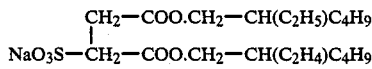

Then, 15 g of polymer (I) having the following structure and 5 g of polymer (II) having the following structure were dissolved in 180 ml of water, and uniformly mixed with 15 ml of 5% surfactant W-1 and 100 g of 10% lime-processed gelatin. This mixture solution was uniformly coated in a wet thickness of 85 μm on the above-described composition coated. This sample was dried to prepare a dye-fixing element.

Polymer (I)

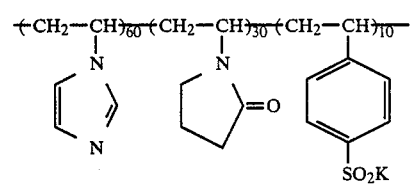

Polymer (II)

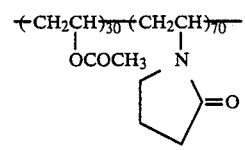

Then, each of the color light-sensitive materials having the aforesaid stratum structure was exposed for one second at 500 lux using a tungsten bulb through G, R, IR-three color separation filters having a continuously changing density (G: constituted by 500 to 600 nm band pass filter; R: 600 to 700 nm band pass filter; IR: filter passing 700 nm or longer).

The samples were then uniformly heated for 30 seconds on a heat block heated to 140° C.

After feeding 15 ml of water to the coated surface of the dye-fixing material, each of the above-described light-sensitive coatings having been heat-treated was superposed on the fixing element with the coated sides facing each other.

The assembly was heated for 3 seconds or 6 seconds on an 80° C. heat block. Upon peeling the dye-fixing element apart from the light-sensitive element, yellow, magenta, and cyan color images were obtained on the fixing elements corresponding to the G, B, and IR three color separation filters.

Then, a transparent film having an ultraviolet ray-absorbing layer was superposed on the coated surface of each of the image-fixing elements having the negative image, and the images were irradiated with xenon light (100,000 lux) for seven days using Allas C.I 65 Weather-O-meter. Color image density of each image was measured before and after the irradiation with xenon light to evaluate fastness of color images to light. The transfer densities of yellow obtained corresponding to G filter and dye-remaining ratios (expressed as a % value) at a reflection density of 1.0 are tabulated in Table 2.

TABLE 2

| Dye-Providing Substance | Max. Density After Heating For 3 Sec. | Max. Density After Heating For 6 Sec. | Dye-Remaining Ratio (%) | Note |
| --- | --- | --- | --- | --- |
| (2) | 1.75 | 2.19 | 79 | present invention |
| (C) | 1.22 | 2.02 | 60 | comp. ex. |
| (3) | 1.77 | 2.18 | 81 | present invention |
| (10) | 1.82 | 2.22 | 78 | present invention |
| (12) | 1.74 | 2.18 | 79 | present invention |
| (17) | 1.70 | 2.10 | 74 | present invention |
| (18) | 1.81 | 2.25 | 77 | present invention |
| (21) | 1.75 | 2.18 | 80 | present invention |
| (24) | 1.75 | 2.16 | 80 | present invention |
| (27) | 1.72 | 2.14 | 76 | present invention |
| (31) | 1.76 | 2.20 | 79 | present invention |

Dye-remaining ratio: $\dfrac{\text{Dye density after irradiation with xenon light for 7 days}}{\text{Dye density before irradiation}} \times 100$ As is apparent from Table 2, the color light-sensitive materials of the present invention containing the yellow dye-providing substances which are image-forming compounds to be used in the present invention show better transferring properties of yellow dye and better light fastness of yellow dye than the comparative sample.

While the invention has been described in detail and with reference to specific embodiments thereof, it will be apparent to one skilled in the art that various changes and modifications can be made therein without departing from the spirit and scope thereof.

What is claimed is:

1. A color light-sensitive material which comprises a support having provided thereon at least a light-sensitive silver halide and an image-forming compound represented by general formula (I)

$$(\text{Dye—X})_{\overline{q}}Y \qquad (I)$$

wherein
X represents a single chemical bond or a divalent linking group,
Y represents a group having the properties of causing differences in diffusibility of the dye moiety before and after reaction with the silver halide corresponding directly or inversely to the silver halide which is in imagewise latent image form,
q represents 1 or 2, and, when q represents 2, the two Dye-X groups are the same or different, and
Dye represents a yellow dye group or dye group precursor represented by formula (II)

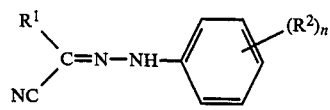

wherein $R^1$ represents a cyano group or a substituent group selected from among the groups represented by formulae (A),

wherein $R^{11}$ represents a substituent selected from among substituted or unsubstituted aryl and heterocyclic groups, and $R^2$ represents an electron attractive group having a Hammett para-sigma value of from 0 to +1.0, n represents an integer of 1 to 4 and, when n represents 2 to 4, the $R^2$ groups are the same or different, and Dye and X are bound to each other at either $R^{11}$ or $R^2$.

2. A color light-sensitive material as in claim 1, wherein X represents a divalent linking group selected from —$NR^3$— (wherein $R^3$ represents a hydrogen atom, an alkyl group, or a substituted alkyl group), —$SO_2$—, —CO—, an alkylene group, a substituted alkylene group, a phenylene group, a substituted phenylene group, a naphthylene group, a substituted naphthylene group, —O—, or —SO—, or groups constituted of a combination thereof.

3. A color light-sensitive material as in claim 1, wherein X represents a divalent linking group selected from —$NR^3$—$SO_2$—, —$NR^3$—CO, or —$R^4$—(L-k)—($R^5$)$_l$—, wherein $R^3$ represents a hydrogen atom, an alkyl group, or a substituted alkyl group, —$SO_2$—, —CO—, an alkylene group, a substituted alkylene group, a phenylene group, a substituted phenylene group, a naphthylene group, a substituted naphthylene group, —O—, or —SO—, or a group constituted of a combination of two or more of these groups, wherein $R^4$ and $R^5$ each represents an alkylene group, a substituted alkylene group, a phenylene group, a substituted phenylene group, naphthylene group, or a substituted naphthylene group L represents —O—, —CO—, —SO—, —$SO_2$—, —$SO_2NH$—, —$NHSO_2$—, —CONH—, or —NHCO—, k represents 0 or 1, and l represents 1 when k=1 or represents 1 or 0 when k=0.

4. A color light-sensitive material as in claim 1, wherein X represents a divalent linking group selected from a combination of —$NR^3$—$SO_2$—, —$NR^3$—CO— with —$R^4$—($L_k$)—($R^5$)$_l$, wherein $R^3$ represents a hydrogen atom, an alkyl group, or a substituted alkyl group, —$SO_2$—, —CO—, an alkylene group, a substituted alkylene group, a phenylene group, a substituted phenylene group, a naphthylene group, a substituted naphthylene group, —O—, or —SO—, or a group constituted of a combination of two or more of these groups, wherein $R^4$ and $R^5$ each represent an alkylene group, a substituted alkylene group, a phenylene group, a substituted phenylene group, a naphthylene group, or a substituted naphthylene group, L represents —O—, —CO—, —$SO_2$—, —$SO_2NH$—, —$NHSO_2$—, —CONH—, or —NHCO, k represents 0 or 1, and l represents 1 when k=1 or represents 1 or 0 when k=0.

5. A color light-sensitive material as in claim 1, wherein $R^{11}$ represents a substituted or unsubstituted aryl group having from 6 to 8 carbon atoms, or a substituted or unsubstituted heterocyclic group having from 4 to 8 carbon atoms.

6. A color light-sensitive material as in claim 1, wherein $R^2$ represents a halogen atom, a cyano group, a carboxyl group, a substituted or unsubstituted carbamoyl group having from 1 to 5 carbon atoms, a substituted or unsubstituted sulfamoyl group having up to 4 carbon atoms, or a substituted or unsubstituted sulfonyl group having from 1 to 4 carbon atoms.

* * * * *